(12) United States Patent
Nordbruch

(10) Patent No.: US 10,338,587 B2
(45) Date of Patent: Jul. 2, 2019

(54) CONTROLLING A MOTOR VEHICLE

(71) Applicant: Robert Bosch GmbH, Stuttgart (DE)

(72) Inventor: Stefan Nordbruch, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 46 days.

(21) Appl. No.: 15/299,574

(22) Filed: Oct. 21, 2016

(65) Prior Publication Data

US 2017/0115663 A1 Apr. 27, 2017

(30) Foreign Application Priority Data

Oct. 26, 2015 (DE) .................... 10 2015 220 821

(51) Int. Cl.
| | |
|---|---|
| *G05D 1/00* | (2006.01) |
| *G06N 5/04* | (2006.01) |
| *G06N 7/00* | (2006.01) |
| *G08G 1/01* | (2006.01) |
| *G08G 1/0967* | (2006.01) |
| *B60W 30/00* | (2006.01) |

(52) U.S. Cl.
CPC ............ *G05D 1/0088* (2013.01); *B60W 30/00* (2013.01); *G06N 5/048* (2013.01); *G06N 7/005* (2013.01); *G08G 1/0112* (2013.01); *G08G 1/0133* (2013.01); *G08G 1/0141* (2013.01); *G08G 1/096716* (2013.01); *G08G 1/096725* (2013.01); *G08G 1/096741* (2013.01); *G08G 1/096775* (2013.01)

(58) Field of Classification Search
CPC ............... G05D 1/0088; B60W 30/00; G08G 1/096741; G08G 1/096725; G08G 1/096716; G08G 1/096775; G08G 1/0112; G08G 1/0133; G08G 1/0141; G06N 7/005; G06N 5/048
See application file for complete search history.

(56) References Cited

U.S. PATENT DOCUMENTS

| | | | | |
|---|---|---|---|---|
| 2015/0339921 | A1* | 11/2015 | Hainzlmaier | .... G08G 1/096811 340/905 |
| 2017/0101093 | A1* | 4/2017 | Barfield, Jr. | ........ B60W 30/095 |

* cited by examiner

*Primary Examiner* — Yuen Wong
(74) *Attorney, Agent, or Firm* — Norton Rose Fulbright US LLP; Gerard Messina

(57) ABSTRACT

A method for controlling a third motor vehicle, includes scanning, by a first motor vehicle, the surroundings of the first motor vehicle and determining an assumption for a traffic situation based on the scanned information; transmitting the assumption thus determined from the first motor vehicle to a central office, scanning, by a second motor vehicle, the surroundings of the second motor vehicle and determining an assumption for a traffic situation based on the scanned information, transmitting the assumption thus determined from the second motor vehicle to a central office, whereupon the surroundings of the first and a the second motor vehicle overlap, determining, by the central office, a traffic situation in the area of the first and second motor vehicles on the basis of the transmitted information and transmitting the traffic situation thus determined to a third motor vehicle to enable prompt consideration of the traffic situation thus determined.

9 Claims, 3 Drawing Sheets

CONTROLLING A MOTOR VEHICLE

CROSS REFERENCE

The present application claims the benefit under 35 U.S.C. § 119 of German Patent Application No. DE 102015220821.4 filed on Oct. 26, 2015, which is expressly incorporated herein by reference in its entirety.

FIELD

The present invention relates to controlling a motor vehicle. In particular, the present invention relates to the evaluation of information about the surroundings of other motor vehicles in order to control the motor vehicle.

BACKGROUND INFORMATION

To be able to improve the control of a motor vehicle en route on a section of road, it is helpful to have information available about a traffic situation on that section of road. The traffic situation may be determined with the aid of another motor vehicle in the vicinity, for example. For this purpose, the other motor vehicle includes a number of sensors whose data are compared to obtain a usable piece of information from the measured physical circumstances, which may be used to estimate the traffic situation in the area of the second motor vehicle. For example, an object in the area of the second motor vehicle may be scanned on the basis of optical data, radar data and data from an ultrasonic sensor, and during processing of the various data, the object may be recognized as a snowplow or sanding truck, for example, which clears and spreads (e.g., salt, sand) a section of road at the same time.

One problem here is that the determination of the traffic situation in the vicinity of a motor vehicle usually requires multiple sensors and complex and rapid processing. Such well equipped vehicles are presently to be found primarily in the luxury class. Such vehicles are not widespread enough for determining traffic situations on a given road system with even approximately comprehensive coverage.

The present invention is based on the object of providing an improved technique for controlling a motor vehicle.

SUMMARY

According to a first aspect of the present invention, a method for controlling a third motor vehicle includes steps of scanning, on the part of the first motor vehicle, the surroundings of the first motor vehicle and determining an assumption for a traffic situation on the basis of the scanned information; transmitting the assumption thus determined from the first motor vehicle to a central office; scanning, on the part of a second motor vehicle, the surroundings of the second motor vehicle and determining an assumption for a traffic situation on the basis of the scanned information; transmitting the assumption thus determined from the second motor vehicle to a central office; whereupon the surroundings of the first and second motor vehicles overlap; determining, on the part of the central office, a traffic situation in the area of the first and second motor vehicles on the basis of the transmitted information; and transmitting the traffic situation thus determined to the third motor vehicle in order to make it possible to promptly take into account the traffic situation thus determined.

The idea on which the present invention is based is that, for determining the traffic situation, more sensor data or more processing capacity is usually necessary than is available on an average motor vehicle, but there are enough motor vehicles which have at least a few sensors and have certain, although limited, processing capacities. Such motor vehicles are found primarily in the middle or compact class, which form a significant portion of the motor vehicles in today's road traffic. For example, a first motor vehicle may have an ultrasound-based parking assistant, so that it is at least able to detect obstacles in the immediate area and, if necessary, assign them to an object class (for example, a stationary obstacle, a person or motor vehicle). The traffic situation may not yet be determined on the basis of this determination, but in many cases it may already be assumed.

The third motor vehicle may, if it is situated in the area of the first and second motor vehicles, be controlled in an improved manner based on the traffic situation thus determined. The assumptions received from the first and second motor vehicles are advantageously evaluated for the determination of the traffic situation on the part of the central office. The more of these assumptions are available, the more precise and accurate the traffic situation thus determined may be. This method may make it possible to determine a traffic situation with high reliability so that reliable recommendations for action may be derived from the traffic situation thus determined. The assumptions of the first and second motor vehicles may be combined in the above example to differentiate between persons on a road and a stray animal.

In addition, a degree of reliability, which indicates a probability of correspondence between the traffic situation thus determined and the prevailing traffic situation may be determined on the part of the first and second motor vehicles and transmitted to the central office. For example, if the scanned information is unambiguous or if pieces of information from multiple sensors may be combined without contradiction, then the reliability of the assumption thus determined may be high, whereas it may be low, for example, if information from only one sensor is evaluated or if the sensor information contains too much noise.

The traffic situation may be determined in an improved way on the part of the central office if it is also known, preferably for each received assumption, how great the degree of reliability is.

The central office may additionally determine a degree of reliability, which indicates the probability of the correspondence of the traffic situation thus determined with the prevailing traffic situation and may transmit it to the third motor vehicle. The degree of reliability may be determined by analyzing the received assumptions and/or by taking into account the received degrees of reliability of the first or second motor vehicles. The third motor vehicle may therefor evaluate in an improved manner to what extent the received traffic situation may be trusted.

In particular, when information from a plurality of first and second motor vehicles is transmitted to the central office, there may be assumptions based on various sensor technologies (for example, video, radar, LIDAR, ultrasound), using different sensors of the same sensor technology, for example, in different quality levels or expansion stages or from different suppliers as well as different algorithms for processing sensor information. It is possible in particular to put similar or corresponding assumptions based on the same traffic situation into context with one another and use them as a basis for a verified or validated determination of a traffic situation.

It is preferred in particular that on the part of the first or second motor vehicle, pieces of information from multiple sources may be combined to determine the traffic situation. A source may include in particular a sensor or a sensor system. The more sources are used and the better the quality of the sources, the better may be the assumption thus determined about the traffic situation.

The combination may include in particular the determination of a circumstance on the basis of different physical variables. The circumstance is based in particular on the traffic situation. Examples of circumstances include a double-parked motor vehicle, an emergency motor vehicle (police, ambulance) or a pedestrian on the road. To scan such a circumstance, various sensors may be used, one of which includes, for example, a passive light sensor (camera), another includes an active light sensor (LIDAR) and yet another includes an ultrasonic sensor. Linking various sensor values to determine a circumstance relating to the second motor vehicle is already being implemented in the field of automated driving, for example.

In another specific embodiment, the first and/or second motor vehicle(s) additionally transmit(s) the scanned information to the central office. Raw data may therefore be available from the central office, and the determination of the traffic situation may be improved on the basis of such data. The present raw data may be linked together in an improved manner, which is impossible on board the motor vehicles, due to lack of knowledge of the raw data of the other motor vehicle. The required processing capacity may be provided more easily and at a reduced cost at the central office.

In one specific embodiment, the central office determines the traffic situation on the basis of a combination of the received pieces of information or assumptions. For example, if two pieces of information fundamentally contradict one another, it may be inferred that one or both assumptions are incorrect.

In another specific embodiment, the central office determines the traffic situation on the basis of statistical averaging. For example, if ten received assumptions refer to a first traffic situation and only one received assumption contradicts this traffic situation, then the latter assumption may be treated as a statistical outlier and discarded. A statistical average of the assumptions may also be determined, for example, when a specific location or a specific time of an event or an object is to be determined.

According to a second aspect, a computer program product includes program code means for carrying out the method described here when the computer program product is running on a processing unit or is stored on a computer-readable data medium.

According to a third aspect of the present invention, a control unit for controlling a third motor vehicle includes a receiver for receiving an assumption thus determined by a first motor vehicle for a traffic situation in the area of the second motor vehicle; a receiver for receiving an assumption thus determined by a second motor vehicle for a traffic situation in the area of the third motor vehicle; whereupon the areas of the first and second motor vehicles overlap; and a processing unit for determining a traffic situation in the area of the second and third motor vehicles on the basis of the received assumptions.

The two receivers may also be integrated or coincide with each other. In one particular preferred specific embodiment, at least one of the receivers includes a car-to-infrastructure interface.

BRIEF DESCRIPTION OF THE DRAWINGS

The present invention is described in greater detail below with reference to the figures.

DETAILED DESCRIPTION OF EXAMPLE EMBODIMENTS

Figure 1:
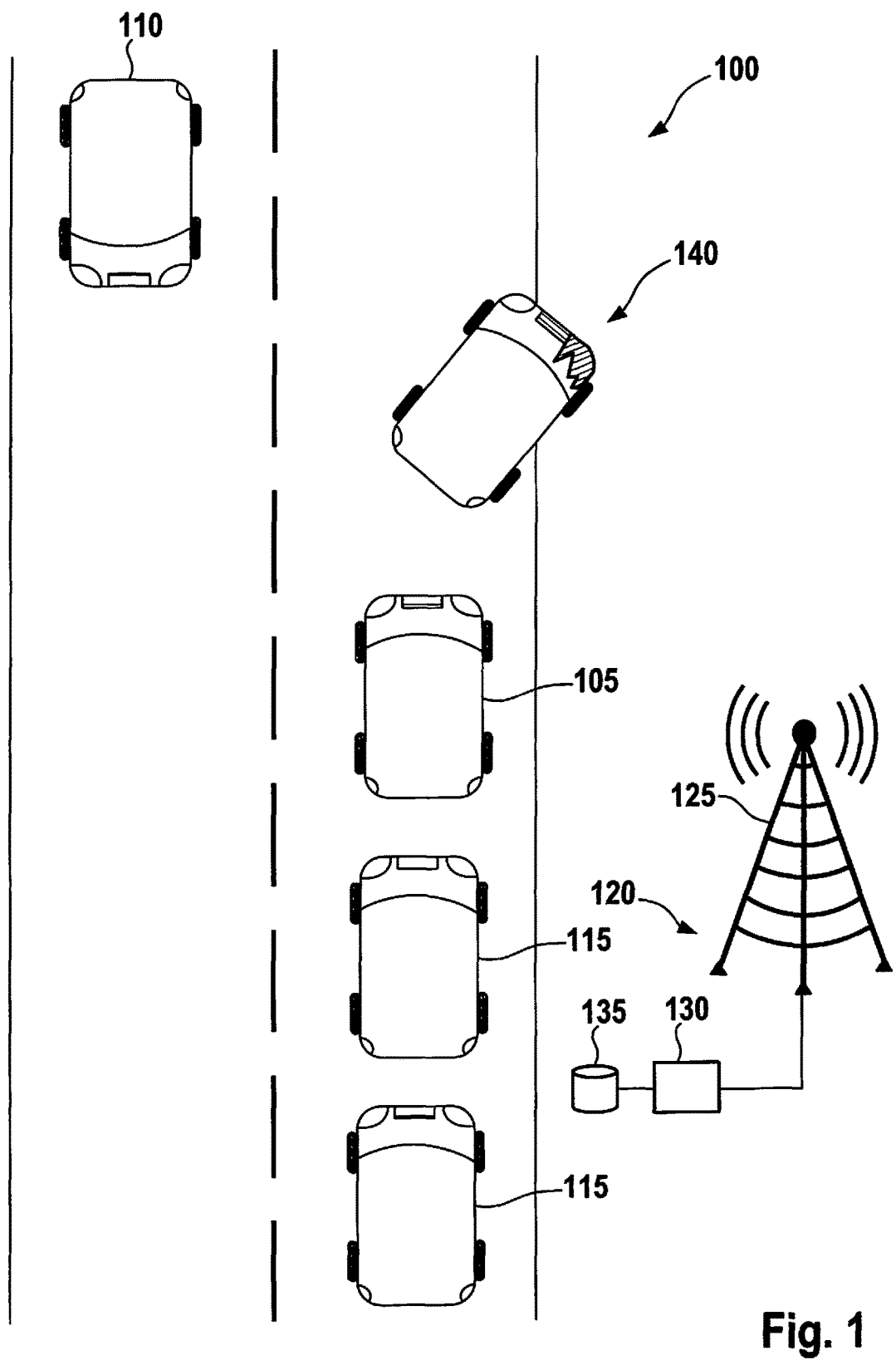
FIG. 1 shows a system for controlling a motor vehicle.

FIG. 1 shows a system 100 for controlling a third motor vehicle 115, whereby FIG. 1 shows multiple third motor vehicles 115 as an example. Information from the surroundings of respective motor vehicle 105, 110 is scanned and interpreted by a first motor vehicle 105 and a second motor vehicle 110 and the interpretation results are transmitted to a central office 120. In the present example, it is assumed that the areas scanned by two motor vehicles 105, 110 are congruent with one another or at least overlap. The interpretation results pertain to an assumption about a traffic situation prevailing in the respective scanned area in particular. In the present case, it is referred to as an assumption instead of a determination when the scanning or processing options on board motor vehicles 105, 110 are not suitable for determining a traffic situation with sufficient certainty, reliability, accuracy or speed. In particular, the assumption may be determined on the basis of just one type of sensor data (for example, distance data). To arrive at a determination from the assumption would usually require a combination of several types of sensor data (for example, video data in addition) to rule out mismeasurements.

Transmission of the assumptions from motor vehicles 105, 110 to central office 120 preferably takes place wirelessly, to which end a car-to-infrastructure interface (C2I) 125 may be used. Interface 125 may include, for example, a wireless network or a mobile network. A preferably great variety of first and second motor vehicles 105, 110 is usually provided, but motor vehicles 105, 110 may differ in their locations, directions of travel or speeds. Motor vehicles 105, 110 may also have different equipment, for example, different types of sensors.

Central office 120 preferably includes a processing unit 130 and an optional data memory 135. The task of central office 120 is to receive messages from first motor vehicle 105 and second motor vehicle 110 and to put the received data into context to determine the traffic situation in the area of the first and second motor vehicles 105, 110. Where central office 120 is located physically does not matter for system 100 shown here, so that central office 120 may also be implemented as a distributed service or cloud service. The traffic situation thus determined is made available by central office 120 in particular in the scanned area, whereby a wireless transmission is again preferably used, possibly with the aid of C2I.

If a planned route of third motor vehicle 115 leads past the area for which the traffic situation was determined, for example, then third motor vehicle 115 may be controlled in an improved manner by taking into account the traffic situation prevailing in this area. Action or an action recommendation may be determined on board third motor vehicle 115 on the basis of the received traffic situation. In another specific embodiment, action or an action recommendation for third motor vehicle 115 is determined by central office 120 and transmitted to third motor vehicle 115. The recommended action may be, for example, a general hazard warning, a speed recommendation, a detour recommendation for using a route other than the planned route or another message, which may be used on board third motor vehicle 115 for improved control. The recommendation may be implemented by a driver of third motor vehicle 115 or an automatic steering unit on board third motor vehicle 115. The traffic situation thus determined may be relevant for multiple third motor vehicles 115, so that the traffic situation or the information associated with it may be made available to a multitude of road users, for example, with the aid of a one-to-many connection (broadcast). Each third motor vehicle 115 may decide on its own whether or not a certain traffic situation is relevant for it.

FIG. 1 shows an exemplary danger zone 140, where another motor vehicle has been in an accident. First motor vehicle 105 and second motor vehicle 110 are both affected by danger zone 140, i.e., both motor vehicles 105, 110 are in the area of or pass by danger zone 140. In the example shown here, first motor vehicle 105 is within sight of danger zone 140, whereas second motor vehicle 110 is approaching danger zone 140 from another direction.

Third motor vehicle 115 is en route to the same section of road on which first motor vehicle 105 and second motor vehicle 110 are located. It is assumed that the points in time when three motor vehicles 105, 110 and 115 are affected by the same traffic situation are close enough to one another so that an effect actually occurs. In a larger system 100, a statistical distribution of first, second and third motor vehicles 105, 110 and 115 may be assumed, so that, generally, there is informational blanket coverage of the area, i.e., a relevant traffic situation for this motor vehicle 115 may be determined at practically any point in time for practically any third motor vehicle 115.

Figure 2:
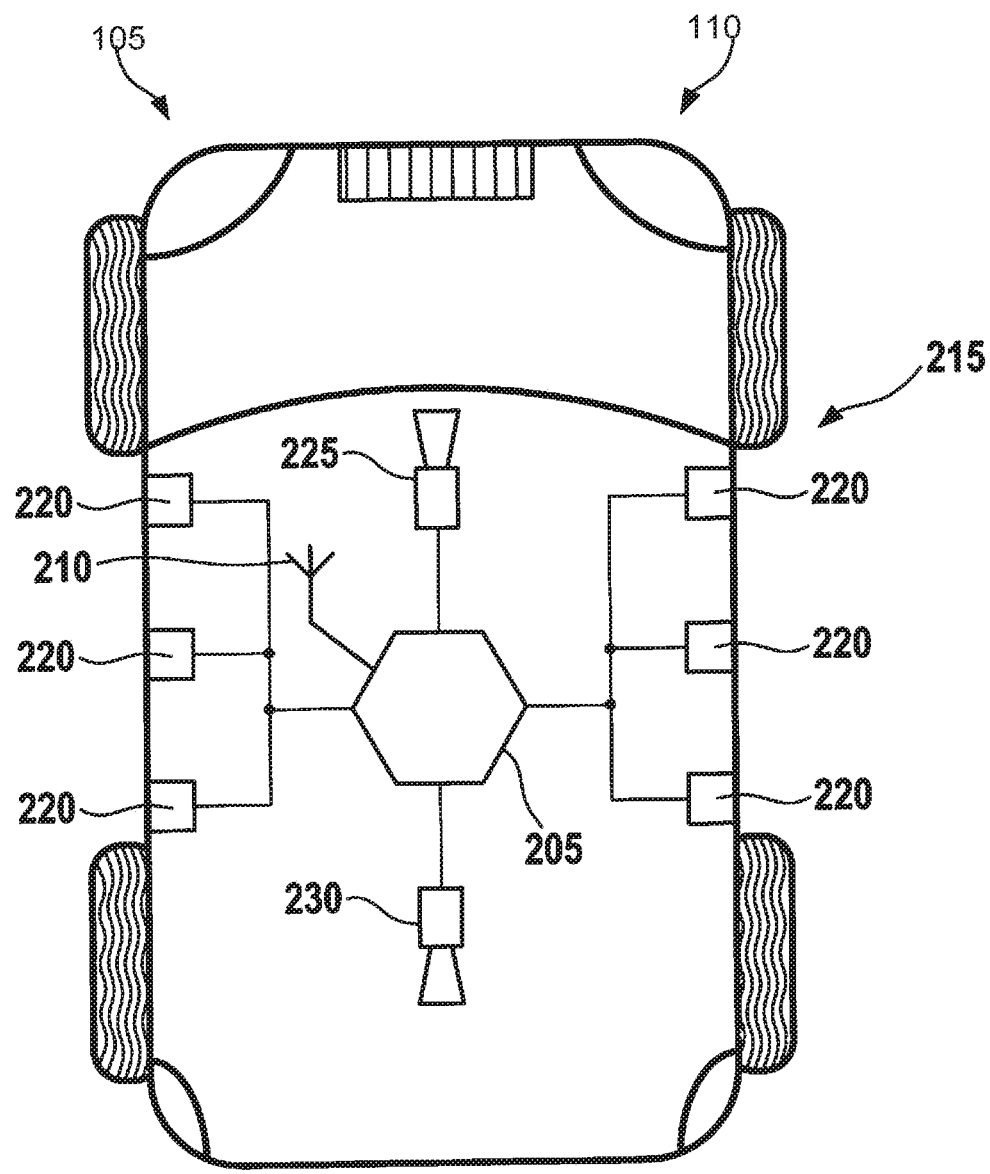
FIG. 2 shows an example of a motor vehicle for the system from FIG. 1.

FIG. 2 shows an example of a motor vehicle 105, 110 for system 100 from FIG. 1. Motor vehicle 105,110 may have different sensor equipment for monitoring the surroundings or a processing unit for processing the sensor signals.

Motor vehicle 105, 110 includes a processing unit 205, an interface 210 for communication with central office 120 and at least one sensor 215. Interface 210 may include in particular a car-to-infrastructure interface, which is configured for communication with interface 125 of system 100 from FIG. 1.

Motor vehicle 105, 110 includes only one or a few sensors 215, which scan data from the surroundings of motor vehicle 105, 110 and forward the data to processing unit 205. Lateral ultrasonic sensors 220 for scanning a near range of motor vehicle 105, 110 are shown as an example. In other specific embodiments, a front camera 225 or a rearview camera 230 may be provided. In other specific embodiments, practically any possible surroundings sensor for motor vehicle 105, 110 may be provided, for example, a radar sensor, a LIDAR sensor or a microphone.

The scanning options of sensors 215 of motor vehicle 105, 110 or the processing capacity of its processing unit 205 is limited, so that the traffic situation in the area of third motor vehicle 115 may be determined essentially only in the form of an assumption. The number of different types of sensors 215 is usually no more than three to five.

In a first example, motor vehicle 105, 110 detects "multiple red-white stationary objects" in its surroundings on the basis of information from front camera 225. The assumption that these objects might be warning cones protecting a construction site may then be extracted from this information.

In a second example, a radar sensor is provided with which motor vehicle 105, 110 detects a large, slow-moving object driving on the left side of a preceding lane and being passed on the right side by motor vehicles driving ahead of motor vehicle 105, 110, specifically at a high relative velocity. The assumption that the object is a truck warning of mobile road maintenance might be expressed.

In a third example, multiple small moving objects may be determined moving at the right or left of motor vehicle 105, 110 with the aid of ultrasonic sensors 220. The assumption derived here might be that the small objects are people moving on the road used by third motor vehicle 115.

In a fourth example, a large stationary object is determined with one of sensors 215, motor vehicles traveling ahead of motor vehicle 105, 110 passing this object on the left. It might be assumed that the large object is a disabled motor vehicle, as also illustrated by danger zone 140 in FIG. 1 as an example.

Motor vehicle 105, 110 transmits the assumption thus determined and optionally also information on which the assumption thus determined is based to central office 120, which processes this information via processing unit 130 and optionally stores it in data memory 135.

Figure 3:
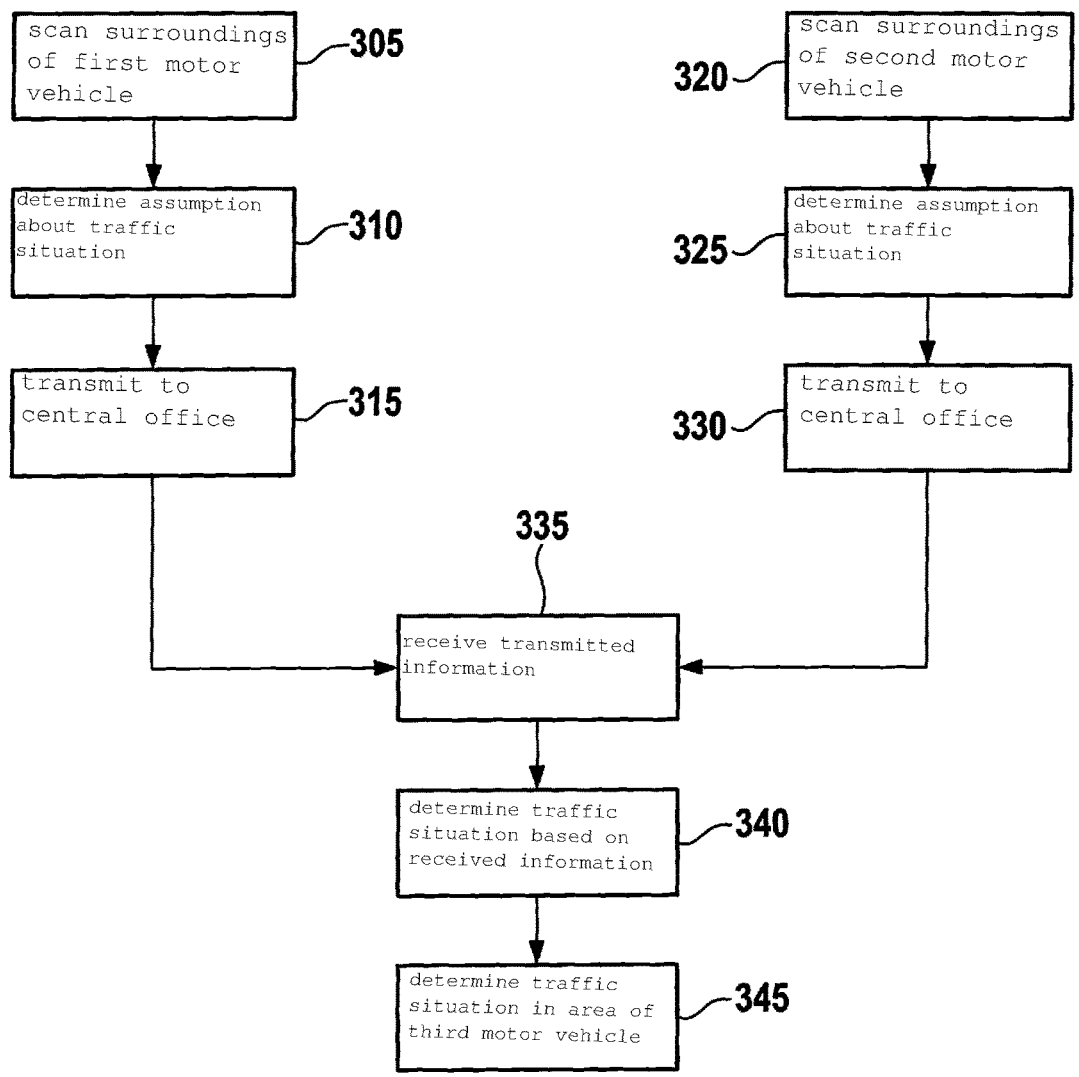
FIG. 3 shows a flow chart of a method for controlling the motor vehicle from FIG. 1.

FIG. 3 shows a flow chart of a method 300 for controlling motor vehicle 105 from FIG. 1.

In a first step 305, surroundings of first motor vehicle 105 are scanned. In a step 310, an assumption for a traffic situation in the area of first motor vehicle 105 is determined from this information. The assumption thus determined and, if necessary, data processed to a lesser extent, with which the information was scanned in step 305, are then transmitted to central office 120 in a step 315.

Similarly, in a step 320, surroundings of second motor vehicle 110 are scanned, whereupon in step 325, on the basis of the results of the scan, an assumption is determined for a traffic situation in the area of second motor vehicle 110. In a step 330, the assumption and, if necessary, data processed to an even lesser extent of sensors 215 based on the scan in step 320 are transmitted to central office 120.

In a step 335, the information transmitted from motor vehicles 110 and 115 is received by central office 120. For method 300, it is irrelevant in which order the information of motor vehicles 105 and 110 is received. Preferably, however, as much information as possible is received from motor vehicle 105, 110.

In a step 340, a traffic situation in the area of motor vehicles 105, 110 is determined by central office 120 on the basis of the received assumptions. In a step 345, the traffic situation in the area of third motor vehicle 115 is optionally also determined, for example, with the aid of geographic or temporal extrapolation or interpolation of one or multiple determined traffic situations. To minimize extrapolation or interpolation, it is preferred for the received information from motor vehicles 105, 110 to be based spatially and temporarily on a preferably narrowly defined area, so that there will be a correlation. Ideally the areas overlap spatially. Furthermore, in step 345, control information or a control recommendation for third motor vehicle 115 may be determined on the basis of the traffic situation thus determined. The traffic situation thus determined and/or the control information or recommendation may then be transmitted to first motor vehicle 105. In one specific embodiment, car-to-infrastructure interface 125 is used for this purpose.

What is claimed is:
1. A method for controlling a third motor vehicle, comprising:
  scanning, by a first motor vehicle, surroundings of the first motor vehicle and determining a traffic situation on the basis of the scanned information;
  transmitting the determined traffic situation from the first motor vehicle to a central office;

scanning, by a second motor vehicle, surroundings of the second motor vehicle and determining a traffic situation on the basis of the scanned information, the surroundings of the first motor vehicle overlapping with the surroundings of the second motor vehicle;

transmitting the determined traffic situation from the second motor vehicle to a central office;

determining, by the central office, a traffic situation in the area of the first motor vehicle and the second motor vehicle on the basis of the transmitted information;

transmitting the determined traffic situations for the surroundings of the first and second motor vehicles to the third motor vehicle to enable consideration of the traffic situations thus determined; and at the third motor vehicle, activating an automatic steering unit to physically control a movement of the third motor vehicle on the basis of the determined traffic information determined for the surroundings of the first and second motor vehicles, wherein the third motor vehicle is incapable of transmitting any communication to the first motor vehicle and to the second motor vehicle.

2. The method as recited in claim 1, further comprising:

determining, by the first motor vehicle and the second motor vehicle, a respective degree of reliability, which indicates a probability of correspondence of the determined traffic situation with a prevailing traffic situation, and transmitting to the central office, by the first motor vehicle and second motor vehicle, the respective degrees of reliability.

3. The method as recited in claim 1, wherein the central office additionally transmits a degree of reliability to the third motor vehicle, wherein the degree of reliability indicates a probability of correspondence of the determined traffic situation with a prevailing traffic situation.

4. The method as recited in claim 1, wherein on the part of the first motor vehicle or the second motor vehicle, pieces of information from multiple sources are combined to determine the traffic situation.

5. The method as recited in claim 4, wherein the combination includes a determination of a circumstance on a basis of different physical variables.

6. The method as recited in claim 1, wherein at least one of the first motor vehicle and the second motor vehicle additionally transmits the scanned information to the central office.

7. The method as recited in claim 1, wherein the central office determines the traffic situation by combining the determined traffic situations from the first and second motor vehicles.

8. The method as recited in claim 1, wherein the central office determines the traffic situation by statistical averaging.

9. A non-transitory computer-readable storage medium on which is stored program code for controlling a third motor vehicle, the program code, when executed by a computer, causing the computer to cause:

scanning, by a first motor vehicle, surroundings of the first motor vehicle and determining a traffic situation on the basis of the scanned information;

transmitting the determined traffic situation from the first motor vehicle to a central office;

scanning, by a second motor vehicle, surroundings of the second motor vehicle and determining a traffic situation on the basis of the scanned information, the surroundings of the first motor vehicle overlapping with the surroundings of the second motor vehicle;

transmitting the determined traffic situation from the second motor vehicle to a central office;

determining, by the central office, a traffic situation in the area of the first motor vehicle and the second motor vehicle on the basis of the transmitted information;

transmitting the determined traffic situations for the surroundings of the first and second motor vehicles to the third motor vehicle to enable consideration of the traffic situations thus determined; and at the third motor vehicle, activating an automatic steering unit to physically control a movement of the third motor vehicle on the basis of the determined traffic information determined for the surroundings of the first and second motor vehicles, wherein the third motor vehicle is incapable of transmitting any communication to the first motor vehicle and to the second motor vehicle.

* * * * *